July 5, 1966   W. MÖLLER   3,259,459

PROCESS FOR THE PRODUCTION OF SULFUR TRIOXIDE

Filed Aug. 26, 1963

INVENTOR.
WILHELM MÖLLER
BY
Burgess, Dinklage & Sprung
ATTORNEYS

United States Patent Office 3,259,459
Patented July 5, 1966

3,259,459
PROCESS FOR THE PRODUCTION OF SULFUR TRIOXIDE
Wilhelm Möller, Leverkusen, Germany, assignor to Farbenfabriken Bayer Aktiengesellschaft, Leverkusen, Germany, a corporation of Germany
Filed Aug. 26, 1963, Ser. No. 304,507
Claims priority, application Germany, Feb. 20, 1960, F 30,595
11 Claims. (Cl. 23—176)

This application is a continuation-in-part of application Serial No. 89,137, filed February 14, 1961, now abandoned.

Sulfuric acid can be prepared catalytically by burning industrially produced sulfur dioxide in admixture with excess air while passing the gases at a suitable temperature, over catalysts (for example vanadium pentoxide-kieselguhr or platinum catalysts). It is only when the catalyst has predetermined minimum temperature, the so-called initiation or ignition temperature (for example 450° C.) that the following reaction takes place:

$$SO_2 + \tfrac{1}{2} O_2 \rightarrow SO_3 + Q$$

The value of the initiation temperature depends not only on the catalysts, its composition and its method of production, but also on the special furnace, wherein the process is performed. Therefore, the initiation temperature of a special catalyst determined in a laboratory equipment does not correspond to the value of the initiation temperature necessary to start the reaction in a contact furnace on a technical scale, with other words the initiation temperature is a value of some complexity.

The reaction heat which occurs on passing the gas through the catalyst is proportional to the degree of conversion. At a certain temperature which depends on the initial composition of the gas, for example at 580° C. the reaction stops, because the speed of formation of the sulfur trioxide becomes equal to its speed of decomposition. In order to produce a largest possible conversion in this catalyst portion, the temperature range should be as large as possible, i.e. the initial temperature must be kept as low as possible. In other words, the initiation temperature is chosen as the gas inlet temperature.

After this first stage, the hot gas mixture is cooled in suitable manner to below the initiation temperature, for example by heat exchange or by direct or indirect cooling, whereupon it is conducted through a second catalyst part, where heating again occurs. However, since considerable $SO_3$ is already present to inhibit the combustion, the maximum temperature is now much lower, for example 500° C. After passing through this second catalyst part, the mixture is again cooled to the initiation temperature and conducted through a third catalyst part and possibly, after again being cooled, through a fourth catalyst part, and so on.

In this way, the combustion is carried a step further each time and theoretically to a degree of conversion which is dependent on the temperature of the gas leaving the last catalyst part and on the initial composition of the gas.

It is known (and is apparent from the law of mass action) that higher conversions are obtained if gas which is already partially reacted is freed from the sulfur trioxide already formed, for example by washing with sulfuric acid, before it enters a further catalyst part. This proposal is already fully explained in "Handbuch der Schwefelsaurefabrikation" by Bruno Waeser, volume III (1930), pages 1492–1495, and is proved by numerical examples. This principle, which theoretically should lead to a reduction of $SO_2$ concentration to below 0.05% of $SO_2$ in the waste gas, has not been fully exploited industrially in spite of the exceptional interest on the part of the industry concerned with the production of $SO_3$ and of the industrial control authorities in a substantial reduction of the $SO_2$ content in the waste gases from the factories making sulfuric acid. This is obviously due to the fact that when the above principle is followed, the hot gas forming in the first part of the catalysis is cooled by the treatment with relatively cold sulfuric acid to the temperature thereof and then has to be reheated to the initiation temperature of the catalyst mass for carrying out the second catalysis. It is true that this heat requirement is calculated to be recovered from the heat resulting from the oxidation of $SO_2$ to $SO_3$, but as shown by experiments carried out on a large scale, it is exceptionally difficult technically to maintain the necessary temperatures on account of the large heat exchanger surfaces and the unavoidable loss by radiation.

The present invention is concerned with a process for the production of $SO_3$ by the catalyst method in several stages, with interposition of an intermediate absorption, the method comprising reacting the gas residue, which remains after the removal of the $SO_3$ generated in the forward part of the system, in another catalyst furnace part at temperatures which are considerably lower, for example 20–60° C. or 40–60° C. lower, than the initiation temperature obtaining prior to the dissolving out of the $SO_3$. Contrary to former conceptions and experiences, it has in fact been found that the gas which has been freed from the $SO_3$ formed in the preliminary stages surprisingly is oxidized further at temperatures which are considerably below the expected minimum temperature, i.e. the previously defined initiation temperature. This fact could not be deduced or calculated from known laws of physical chemistry.

Thus, the invention provides for removal of sulfur trioxide from partially converted gas between two of a succession of oxidation stages utilized for the conversion. The gas from which the sulfur trioxide is to be removed is cooled and the gas from which sulfur trioxide has been removed is heated to the initiation temperature of the oxidation stage to which it is passed following the removal of sulfur trioxide. The process is characterized in that the heating to the initiation temperature of the subsequent oxidation stage is by indirect heat exchange with gas passed to the removal treatment. The gas treated according to the invention for production of sulfur trioxide can be a roasting gas in purified condition and initially at less than about 70° C. The said gas can be heated prior to contact with catalyst in an oxidation stage by indirect heat exchange with gas from at least one of the oxidation stages. According to the invention, the heating of gas for introduction into the various oxidation stages can be entirely by heat exchange with gas from the oxidation stages. Thereby, use of an external supply of heat is avoided.

The conversion can advantageously be carried out in three stages, including an initial oxidation stage, a first oxidation stage from which the gas produced therein is passed to the removal treatment, and a second oxidation stage, wherein the final conversion is carried out. The sulfur dioxide-containing gas serving as a feed gas for the process can be heated from about 60–70° C. to the temperature for the initial oxidation stage by indirect heat exchange with product streams from various of the oxidation stages, and the product gas of the initial oxidation stage can be cooled to the initiation temperature employed in the first oxidation stage by indirect heat exchange with the feed gas to the initial oxidation stage. The product gas of the first oxidation stage is subjected to absorption and is cooled and heated as has been described above, and is then introduced into the second oxidation stage at the initiation temperature obtaining for that stage.

Apart from the technical simplification produced by this method, it also provides inter alia a considerable lowering of the installation costs, namely to amounts which can be borne economically, and also opens up the possibility of carrying out the second oxidation stage in temperature zones which permit a higher degree of conversion on the basis of the law of mass action.

The present invention is also concerned with a process for lowering the initiation temperature of catalyst masses for the oxidation of sulfur dioxide to sulfur trioxide, and consists in that the sulfur trioxide formed in the partially reacted gas is wholly or partially extracted from the latter.

The invention is further described in reference to the accompanying drawings, wherein.

In the drawings, like reference characters refer to corresponding parts.

Figure 1:
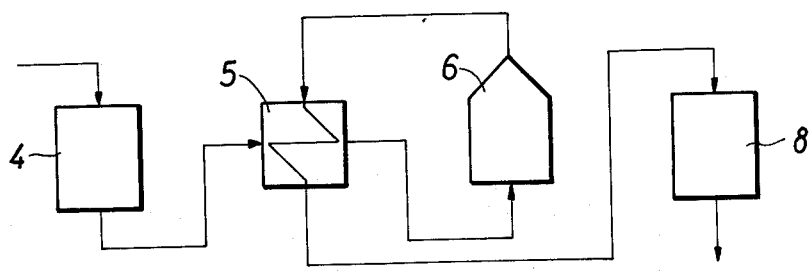
FIG. 1 is a flow sheet for a procedure according to the invention.

Referring to FIG. 1, a sulfur dioxide containing gas is introduced into a first oxidation stage 4 and from this oxidation stage, the product gas passes through an absorber 6 wherein some of the sulfur trioxide present in the gas is absorbed by contacting the gas with sulfuric acid. The product gas from the absorber is passed in indirect heat exchange relation with the product gas from the first oxidation stage in the heat exchanger 5. From the heat exchanger 5, the product gas of the absorber passes through the second oxidation stage 8, wherein the final conversion is effected.

Figure 2:
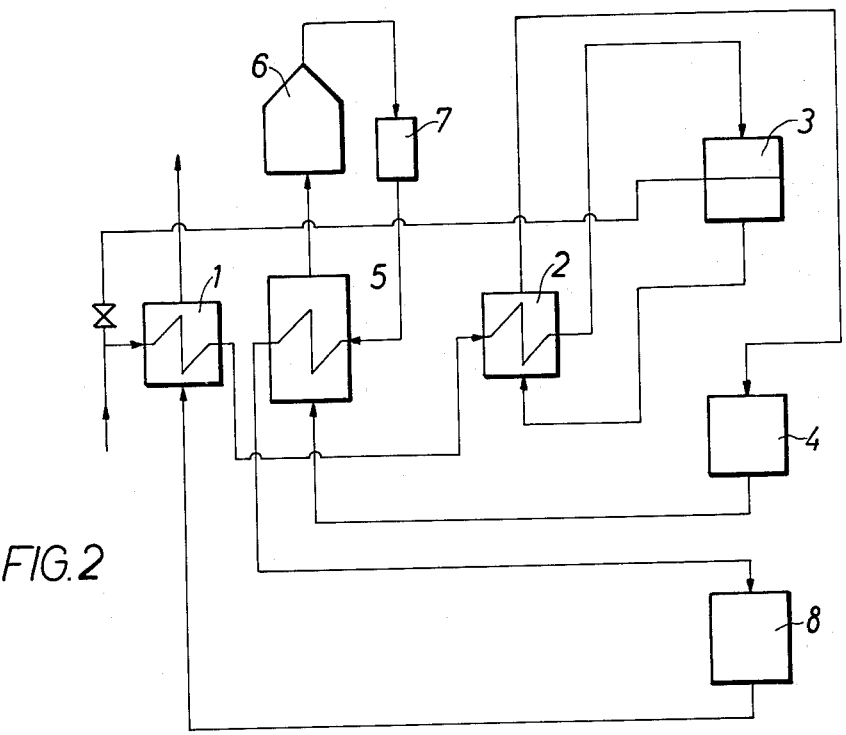
FIG. 2 is a flow sheet for another procedure according to the invention.

The operation of the process is reproduced diagrammatically in the accompanying drawing, FIG. 2. The 10% roasting gases arriving from the roasting furnace pass, for the major part, through heat exchanger 1 and 2 and are heated therein with indirect heat exchange by means of hot catalyst gases to the starting temperature and then pass into a first catalyst stage 3. For high $SO_2$ concentrations, such as 9–12%, the temperature rise with the oxidation to $SO_3$ is so large that the catalyst composition could suffer damage. In order to avoid this, cold roasting gas is supplied to the first catalyst stage. The roasting gases react in the first catalyst stage 3 and are cooled in the heat exchanger 2 to the starting temperature before they enter a second catalyst stage 4, which they leave with a conversion of about 80–95%. The hot catalyst gases of the second stage are cooled in a heat exchanger 5 and then enter an intermediate absorber 6. According to the invention, the height of the trickling layer in this absorber can be only about 20–30% of that of the final absorber. The roasting gases leaving the intermediate absorber 6 are freed from entrained acid by means of an asbestos filter 7 or any other suitable drop separator. They are then preheated again to the starting or initiation temperature of the catalyst stage 8, in the heat exchanger 5, and then are reacted once again in a catalyst stage 8 and, after passing through the heat exchanger 1, they are almost completely absorbed in the final absorber (not shown).

The total conversions are 99.5% and higher. It is advantageous to carry out the intermediate absorption as a hot absorption, and a hot absorption is the subject of copending application Serial No. 137,779, filed September 13, 1961. Whereas the residual gases which must be heated again for further catalysis are cooled to 60–70° C. by absorption in the trickling towers with cold 98% sulfuric acid, they are not or only slightly cooled with the hot absorption. The hot absorption has the essential advantage that the heat exchange surfaces for reheating the gas issuing from the intermediate absorption can be kept correspondingly smaller.

The new process has a number of advantages:

(1) The ultimate gases of the catalytical $SO_2$ combustion can be lead off to the atmosphere without highly uneconomic purification processes being necessary.

(2) As compared with processes which are carried out with dilute $SO_2$ gases, the size of the gas-containing systems in the entire apparatus can be kept small, since the $SO_2$-containing gases are not diluted during the entire process by the admixture of air. This involve not only substantial economical advantages in the building of the apparatus, but also increased yields per unit of time and space.

(3) Since the positive heat evolved in the reaction of $SO_2$ to $SO_3$ is substantially utilized in the plant, energy need not be supplied from outside, even if cold $SO_2$-containing gases are used as starting products. Thus, the heat energy obtained in the purification of roasting gases can be utilized for the production of steam. In the same manner the heat of sulfur combustion gases which can be supplied to the catalytical reaction without purification and without cooling, can be utilized for power generation.

The invention is further described in the following examples. In the examples, the initiation temperature of a gas fed to a subsequent stage and from which $SO_3$ has been removed, is compared with the initiation temperature of the gas fed to the preceding stage, as indicating the significance of the invention. The significance of the invention is at least this much, since the initiation temperature of the gas before $SO_3$ removal is as high or higher than the initiation temperature of the gas fed to the preceding stage.

*Example 1a*

In an industrially produced roasting gas with 9.3% of $SO_2$ and preheated to the initiation temperature of 450° C. to 460° C. about 85 to 90% of the $SO_2$ was converted to $SO_3$ in a multistage kieselguhr-$V_2O_5$ catalytic furnace. By introducing this gas mixture into an absorber of usual design, all the $SO_3$ was dissolved out of the mixture with sulfuric acid. The residual gas cooled to 60 to 80° C. was heated by a means of a heat exchanger to a temperature of only 390 to 410° C., this being in contrast to the preheating to 450 to 460° C. After having passed through the second part of the catalytic furnace, which contained a single layer of catalyst, the total conversion was 99.6 to 99.8% of the sulfur dioxide which originally was present.

*Example 1b*

In an industrially produced roasting gas with 9.5% of $SO_2$ and preheated to an initiation temperature of 360° C. about 95% of $SO_2$ was converted to $SO_3$ in a multistage kieselguhr Kaoline platinum catalytic furnace. By introducing this gas mixture into an absorber of usual design all the $SO_3$ was dissolved out of the mixture with sulfuric acid. The residual gas cooled to 60 to 80° C. was heated by means of a heat exchanger to a temperature of only 310° C., this being in contrast to the preheating to 360° C. After having passed through the second part of the catalytic furnace which contained a single layer of catalyst the total conversion was 99.5% to 99.6% of the sulfur dioxide which originally was present.

*Example 2*

A hurdle-type catalyst furnace of conventional design with three vanadium catalyst stages, which produced a conversion of 97.5% when charged with approximately 7% roasting gas and with a loading of 22 tons $SO_3$ per day, produced a conversion of only 94.5% with the same loading but with an iron pyrites roasting gas with 10% of $SO_2$ and 8% of $O_2$.

An identical catalyst furnace, except that before the last stage, the $SO_3$ so far formed with absorbed by sulfuric acid, produced a conversion of 99.6% with the same loading with pyrites roasting gases (10% $SO_2$, 8% $O_2$) without dilution with air. In this case, the input temperature of the first catalyst stage was 451° C., the reaction temperature prior to admixture of the cold roasting gas was 590° C. and, after the mixing, 552° C.; the gas left the first catalyst stage 3 at 580° C. and a conversion of 73.2%. The gas cooled by a heat exchanger to 450° C. entered the second stage. The discharging gas had a temperature of 497° C. and a conversion of 90.6%. After cooling to 175° C. using a heat exchanger, the gas entered the intermediate absorber, in which it was further cooled to 50° C. The residue of gas freed from the $SO_3$ was preheated by way of the same heat exchanger to 428° C. In the last catalyst stage, the temperature rose to 450° C.; the total conversion was 99.6%.

*Example 3*

The same catalytic furnace as was used in Example 2 with intermediate absorption produced a conversion of 98.7% with a loading of 30 tons of $SO_3$ per day, when using a gas containing 12.2% of $SO_2$ and 9% of $O_2$. The input temperature into the first catalyst stage was 440° C.; it was 610° C. before admixing the cold gas and 510° C. thereafter. The gas left the first catalyst stage at 571° C. and with a conversion of 80%, was cooled by means of a heat exchanger to 448° C. and introduced into the second catalyst stage. In the latter, the temperature rose to 507° C. and the conversion to 92.7%. Thereafter, cooling was carried out to 217° C. by means of a heat exchanger and in the intermediate absorber to 64° C.; the residual gas was heated again in the same heat exchanger to 412° C. and introduced into the third catalyst stage, in which the temperature rose to 439° C. and the total conversion to 99.7%.

While the invention has been described with reference to particular embodiments thereof, these embodiments are merely representative and do not serve to define the limits of the invention.

What is claimed is:

1. In the process for the production of sulfur trioxide by the catalytic oxidation of sulfur dioxide-containing gases the improvement which comprises introducing the sulfur dioxide-containing gases into a first catalytic oxidation stage containing an oxidation catalyst at the initiation temperature for said catalyst to thereby partially catalytically convert the sulfur dioxide to sulfur trioxide, separating the sulfur trioxide from the tail gas from said first catalytic oxidation stage and thereafter passing the tail gas into at least one further catalytic oxidation stage, containing an oxidation catalyst, at a temperature lower than the initiation temperature of the first stage and at least about 20° C. below the initiation temperature which would be required by said catalyst in said further catalytic oxidation stage without prior sulfur trioxide separation.

2. Improvement according to claim 1 in which the tail gas from said first catalytic oxidation stage is cooled for said sulfur trioxide separation and thereafter prior to being passed to said further catalytic oxidation stage is heated by indirect heat exchange contact with the tail gas being passed for said sulfur trioxide separation.

3. Improvement according to claim 1 in which the oxidation catalyst in said first and further catalytic oxidation stages is a platinum catalyst.

4. Improvement according to claim 1 in which the oxidation catalyst in said first and further catalytic oxidation stages is a vanadium catalyst.

5. Improvement according to claim 1 in which the tail gas is passed into said further catalytic oxidation stage at a temperature about 40 to 60° C., below the initiation temperature which would be required by said catalyst in said further catalytic oxidation stage without prior sulfur trioxide separation.

6. Improvement according to claim 1 in which the same type of oxidation catalyst is utilized in said first and further catalytic oxidation stages and in which the gas is introduced into said further oxidation stage at a temperature about 20 to 60° C. below the temperature of introduction into said first catalytic oxidation stage.

7. Improvement according to claim 1 in which the same type of oxidation catalyst is utilized in said first and further catalytic oxidation stages and in which the gas is introduced into said further oxidation stage at a temperature about 40 to 60° C. below the temperature of introduction into said first catalytic oxidation stage.

8. Improvement according to claim 1 in which the oxidation catalyst in said first and further catalytic oxidation stages is a platinum catalyst and in which the gas is introduced into said further stage at a temperature about 40 to 60° C. below the temperature of introduction into the first stage.

9. Improvement according to claim 1 in which the oxidation catalyst in said first and further catalytic oxidation stages is a vanadium catalyst and in which the gas is introduced into said further stage at a temperature about 40 to 60° C. below the temperature of introduction into the first stage.

10. Improvement according to claim 1 in which said sulfur trioxide-containing gas is a purified roasting gas having an initial temperature below about 70° C. and which includes heating the gas prior to introduction into the first catalytic oxidation stage by indirect heat exchange contact with the tail gas from at least one of the oxidation stages.

11. Improvement according to claim 1 in which the sulfur dioxide-containing gas is passed through an initial catalytic oxidation stage prior to being passed to said first catalytic oxidation stage and is cooled prior to being passed to said first catalytic oxidation stage by indirect heat exchange contact with the gas being introduced into said initial oxidation stage.

References Cited by the Examiner

UNITED STATES PATENTS

| | | | |
|---|---|---|---|
| 719,332 | 1/1903 | Herreshoff | 23—176 |
| 1,930,125 | 10/1933 | Fowler | 23—176 |
| 2,471,072 | 5/1949 | Merrian | 23—175 |
| 2,879,135 | 3/1959 | Haltmeier | 23—174 |

OTHER REFERENCES

Auden, H. A.: Sulfuric Acid and Its Manufacture, London, Longmans, Green and Company.

Duecker et al.: "Manufacture of Sulfuric Acid," Reinhold Publishing Company, New York (1959) pp. 163, 164.

Duecker, W. W., and West, J. R.: The Manufacture of Sulfuric Acid, New York, Reinhold Publishing Co., 1959.

Fairlie: Sulfuric Acid Manufacture, Reinhold Publishing Corp., New York (1949) pp. 377, 378.

Miles, F. D.: The Manufacture of Sulfuric Acid, New York, D. Van Nostrand Co. (1925) pages 168–172.

OSCAR R. VERTIZ, *Primary Examiner.*

MAURICE A. BRINDISI, *Examiner.*

R. M. DAVIDSON, *Assistant Examiner.*